United States Patent
Kloft et al.

(10) Patent No.: US 7,178,644 B2
(45) Date of Patent: Feb. 20, 2007

(54) RETARDER, PARTICULARLY PROVIDED AS A BRAKING DEVICE OR AUXILIARY BRAKING DEVICE FOR VEHICLES OR THE LIKE, ESPECIALLY RAIL VEHICLES

(75) Inventors: Lothar Kloft, Brunnenstrasse 11, Limburg-Lindenholzhausen (DE) D-65551; Pablo Carballo Rodriguez, Calle Cobre 15, Torrejon de Ardoz (Madrid) (ES) E-28850

(73) Assignees: Lothar Kloft, Limburg-Lindenholzhausen (DE); Pablo Carballo Rodriguez, Torrejon de Ardoz (ES); Visapa, S.L.U., Alicante (ES)

( * ) Notice: Subject to any disclaimer, the term of this patent is extended or adjusted under 35 U.S.C. 154(b) by 0 days.

(21) Appl. No.: 10/416,527

(22) PCT Filed: Nov. 27, 2001

(86) PCT No.: PCT/EP01/13783

§ 371 (c)(1),
(2), (4) Date: May 27, 2003

(87) PCT Pub. No.: WO02/43229

PCT Pub. Date: May 30, 2002

(65) Prior Publication Data

US 2004/0026191 A1    Feb. 12, 2004

(30) Foreign Application Priority Data

| Nov. 27, 2000 | (DE) | ................................ 100 58 801 |
| Jan. 19, 2001 | (DE) | ................................ 101 02 548 |
| Mar. 23, 2001 | (DE) | ................................ 101 14 183 |

(51) Int. Cl.
*B60L 7/00* (2006.01)

(52) U.S. Cl. ........................................ 188/161; 310/93

(58) Field of Classification Search ........ 188/158–164, 188/267, 264 R; 310/93, 105
See application file for complete search history.

(56) References Cited

U.S. PATENT DOCUMENTS 2,334,976 A * 11/1943 Winther ...................... 310/105

(Continued)

FOREIGN PATENT DOCUMENTS

CH        364549        11/1962

(Continued)

*Primary Examiner*—Christopher P. Schwartz
(74) *Attorney, Agent, or Firm*—Charles P. Boukus

(57) ABSTRACT

A retarder (16), as a braking device or auxiliary braking device for vehicles or the like, in particular rail vehicles, is described, having a stator (3), comprising at least two axially spaced-apart stator halves (3a, 3b), which each have magnetic field coils, and a rotor which is disposed between the at least two stator halves (3a, 3b), the rotor being coupled in a manner fixed against relative rotation to an axle (5) or shaft of the vehicle and the stator being coupled with the vehicle, or a undercarriage (19) of the vehicle. The rotor is formed by at least one rotor disk (1) divided into two parts, comprising two adjacent rotor halves (1a, 1b), which are joined to one another in a radially inner annular region, oriented toward the axle (5) or shaft, and are disposed in a radially outer annular section (7a, 7b), with axial clearance from one another (FIG. 4).

22 Claims, 7 Drawing Sheets

U.S. PATENT DOCUMENTS

| | | | |
|---|---|---|---|
| 2,367,163 A * | 1/1945 | Winther | 310/93 |
| 2,487,551 A | 11/1949 | Hugin | |
| 2,774,895 A * | 12/1956 | Zuckermann | 310/93 |
| 2,791,308 A * | 5/1957 | Barrett et al. | 192/113.3 |
| 2,828,516 A * | 4/1958 | Black et al. | 222/113 |
| 2,968,740 A * | 1/1961 | Griffiths et al. | 310/93 |
| 3,031,592 A * | 4/1962 | Griffiths et al. | 310/93 |
| 3,496,396 A * | 2/1970 | Jollois | 310/93 |
| 3,553,507 A * | 1/1971 | Bessiere | 310/93 |
| 3,821,572 A * | 6/1974 | Bessiere | 310/93 |
| 3,871,466 A * | 3/1975 | Bessiere | 180/370 |
| 4,791,330 A * | 12/1988 | Charbonnier et al. | 310/105 |
| 4,864,173 A * | 9/1989 | Even | 310/93 |
| 5,044,227 A * | 9/1991 | Rugraff | 74/606 R |
| 5,064,029 A * | 11/1991 | Araki et al. | 188/267 |
| 5,855,264 A * | 1/1999 | Rugraff | 192/222 |
| 6,698,554 B2 * | 3/2004 | Desta et al. | 188/158 |

FOREIGN PATENT DOCUMENTS

| | | |
|---|---|---|
| DE | 661026 | 6/1938 |
| DE | 926868 | 4/1955 |
| DE | 1102901 | 3/1961 |
| DE | 1296986 | 6/1969 |
| DE | 3809094 A1 | 10/1988 |
| DE | 3908234 A1 | 8/1990 |
| DE | 19507142 A1 | 10/1995 |
| FR | 1090508 | 10/1954 |
| FR | 1499231 | 9/1957 |
| FR | 1573051 | 5/1969 |
| GB | 575822 | 3/1946 |
| JP | 60-170458 | 9/1985 |
| JP | 61-266064 | 11/1986 |

* cited by examiner

RETARDER, PARTICULARLY PROVIDED AS A BRAKING DEVICE OR AUXILIARY BRAKING DEVICE FOR VEHICLES OR THE LIKE, ESPECIALLY RAIL VEHICLES

FIELD OF THE INVENTION

The invention relates to a retarder, as a braking device or auxiliary braking device for vehicles or the like, in particular rail vehicles, having a stator comprising at least two axially spaced-apart stator halves, which each have magnetic field coils, and a rotor which is disposed between the at least two stator halves, the rotor being coupled in a manner fixed against relative rotation to an axle or shaft of the vehicle and the stator being coupled with the vehicle, or an undercarriage of the vehicle.

BACKGROUND OF THE INVENTION

The term "retarder" is understood herein to be an electrical eddy-current brake, which is intended to reinforce or replace the service brake, for instance of rail vehicles, utility vehicles, or the like in certain situations. The braking action of a retarder arises from the buildup of a magnetic field, which counteracts the rotation of a rotor because of the induction of eddy currents in the rotor. The rotor is connected, for instance to the cardan shaft of the vehicle, in a manner fixed against relative rotation. The magnetic field can be generated for instance by four magnet coils or pairs of magnet coils, which can each be added in succession depending on the braking power individually required. One such retarder is described in detail in German Patent Disclosure DE 39 08 234 A1, for instance, which is hereby expressly incorporated by reference in its full content in the disclosure of the present application.

From Japanese Patent Disclosure JP 61266064, a rotor with the characteristics recited at the outset is already known. According to this, it is provided that an eddy current brake be used in a rail vehicle; the rotor is connected to the wheel axle in a manner fixed against relative rotation, and the stator comprises coils disposed on both sides of the rotor. A disadvantage of the known apparatus is the low braking action, which can be ascribed to the fact, among others, that the coils are distributed over only approximately a semicircle of the rotor.

SUMMARY OF THE INVENTION

With this as the point of departure, it is the object of the invention to disclose an eddy current brake of the type defined at the outset, which is distinguished by strong braking action, a compact design, and high operating performance. In addition, the eddy current brake of the invention should be suitable in particular for rail vehicles.

In the retarder having the characteristics recited at the outset, this object is attained according to the invention essentially in that the rotor is formed by at least one rotor disk divided into two parts, comprising two adjacent rotor halves, which are joined to one another in a radially inner annular region, oriented toward the axle or shaft, in particular by means of a screwing means or similar connecting means, and are disposed in a radially outer annular section, which is essentially adjacent to the magnetic field coils of the stator, with axial clearance from one another.

Because of these provisions, a retarder with a strong braking action, compact structure and high performance is made available that is especially well suited to rail vehicles.

Because of the special design of the rotor as a rotor disk divided in two, where the outer annular sections are disposed with axial clearance from one another, it is assured that the rotor can withstand the thermal stress that occurs from the heat development during the activation of the retarder. Because of this provision of the axial spacing apart of the outer annular sections of the two rotor halves, the possibility of a relative motion of these rotor halves to one another is afforded; this relative motion occurs as the result of variable thermal expansion, especially at high braking capacities. Moreover, in the region of the clearance located between the rotor halves, the rotor can undergo additional cooling. It is assured by the invention that the rotor halves of the rotor have a certain flexibility in the axial direction, so that forces of gravity or the like that can occur because of the thermal stress will be taken into account.

In a first advantageous refinement of the invention, disposed on an outer side of the essentially annular stator, or of the respective outer stator half, is a further outer, preferably one-piece rotor disk, which is connected in a manner fixed against relative rotation to the axle or shaft. In particular, the laterally outward-oriented magnetic fields of the stator, or of the adjacent stator halves, are likewise utilized to generate a braking moment, since further rotor disks, which are preferably embodied in one piece, are positioned in these outer regions of the stator or of the stator halves.

In another aspect, associated with the stator, or the two stator halves, axially spaced apart from it, is a further stator section, which is comparable in shape and structure to the stator halves, so that a second rotor disk, divided into two parts and connected in a manner fixed against relative rotation to the axle or shaft, is disposed in a gap formed by one stator half and the further stator section. In this embodiment, middle rotor disks divided in two are thus provided, which are disposed in the interior of a stator in three pieces. The possibility additionally exists of providing two further, outer rotor disks on the outside of the two outer stator sections of the stator that is divided into three pieces. Overall, the braking moment of the retarder can be increased considerably as a result, with only an insignificant increase in the structural size.

For mechanically stabilizing the two rotor halves of the rotor disk, which is at least divided into two pieces, in the region of the radially outer annular sections oriented toward one another, it is attractive in an advantageous feature of the invention to provide a toothing geometry, in particular a corresponding and partly meshing toothing and counterpart toothing, which preferably have a circular-annular structure. Because of this provision, the mechanical stability of the rotor divided into two pieces is increased considerably, and in addition the surface area between the two rotor halves is increased because of the toothing structure provided.

It is also especially advantageously attractive that the rotor, in particular the rotor disks or rotor halves of the rotor, and/or the stator as well, in particular the stator halves or the stator section, are formed by components that are divided in the radial direction and that after installation are solidly joined to one another by connecting means. Because of this provision, the retarder can for instance be mounted on the axle of a rail vehicle without having to take off the wheel sets to do so.

Advantageously, the stator and in particular the stator halves or the stator section are joined to the vehicle or to an undercarriage via adjustable mounts.

It is also recommended that the stator is connected to a wheel suspension, or is fixed on it, via variable or adjustable tightening elements. This provision, particularly in conjunction with the use of the retarder in rail vehicles, proves advantageous because in freight trains, for instance, the axles can shift by several decimeters in the axial direction relative to the undercarriage or car. Because of this provision, there is accordingly no need to provide some arrangement with which the stator can follow such relative shifts. Instead, because of its connection to the wheel suspension, the stator is subjected to the same displacements as the rotor. Particularly, in a railroad car, it is attractive that the retarder is assigned its own power supply for supplying the magnetic field coils and optionally the electronic controller of the retarder, which power supply is preferably formed by a generator and optionally downstream accumulators, since as a rule these cars have no power supply of their own. The generator can be driven via the axle or shaft, for instance.

Particularly whenever the retarder is used in a locomotive, it is attractive that an intermediate gear is disposed between the axle or shaft and the retarder. In such locomotives, there is a generator for power supply purposes anyway, so that the generator need not be furnished separately.

In another advantageous feature of the invention, the retarder is encapsulated in a housing, preferably comprising aluminum or the like, and the rotor disks are acted upon by a fluid bath, in particular by a coolant fluid. Because of this provision, the thermal stress on the retarder that occurs in the braking event can be minimized, since special cooling of the rotor disks is made possible by means of the coolant fluid.

In still another advantageous feature of the invention, by means of a pump, such as an electric pump, the coolant fluid is circulated in a closed loop between the housing and a heat exchanger by which the thermal energy can be extracted from the retarder securely and quickly.

In a constructive feature of the invention, it proves advantageous that the rotor disks are secured to the axle or shaft by means of tightening elements, and inner and outer annular elements are provided which can preferably be wedged to one another in the axial direction via corresponding oblique faces or conical faces, in particular by means of screws or similar means. By tightening these screws, for instance, in conjunction with the conical outer jacket faces of the inner and outer annular elements, a pressing force in the direction of the axle or shaft is exerted on the outer annular element. The rotor disks are secured to the respective outer annular elements by means of a screw fastening or the like.

It has also proved advantageous that a needle bearing is disposed between the outer annular element and the annularly embodied stator, or similar bearing.

Further objects, advantages and possible applications of the present invention will become apparent from the ensuing description of exemplary embodiments in conjunction with the drawings. All the characteristics described and/or shown in the drawings, on their own or in arbitrary useful combination, form the subject of the present invention, regardless of how they are summarized in the claims or what the claims dependencies are.

DETAILED DESCRIPTION OF THE INVENTION

Figure 1:
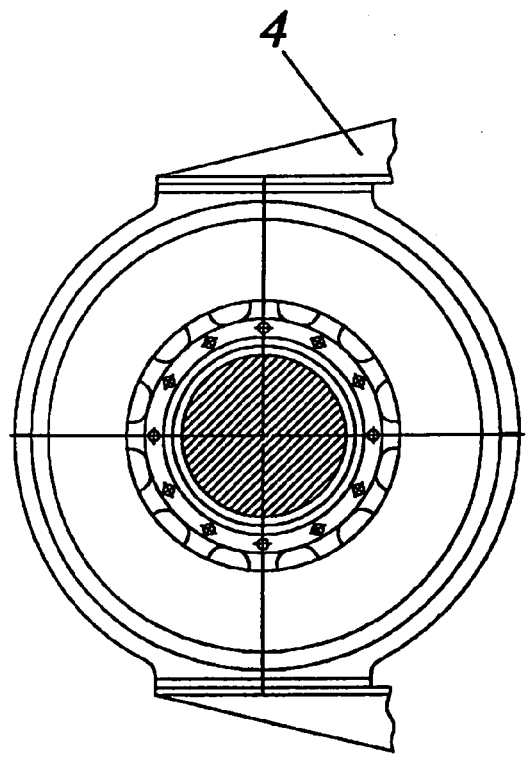
FIG. 1, an elevation view of one possible embodiment of an eddy current brake of the invention, disposed on an axle of a rail vehicle.
Figure 2:
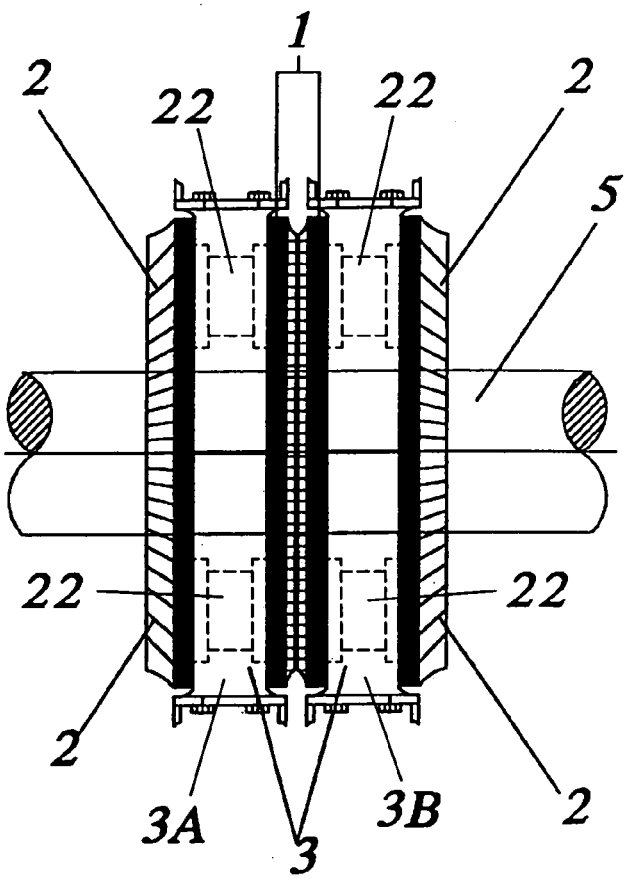
FIG. 2, a side view of the eddy current brake of FIG. 1.
Figure 3:
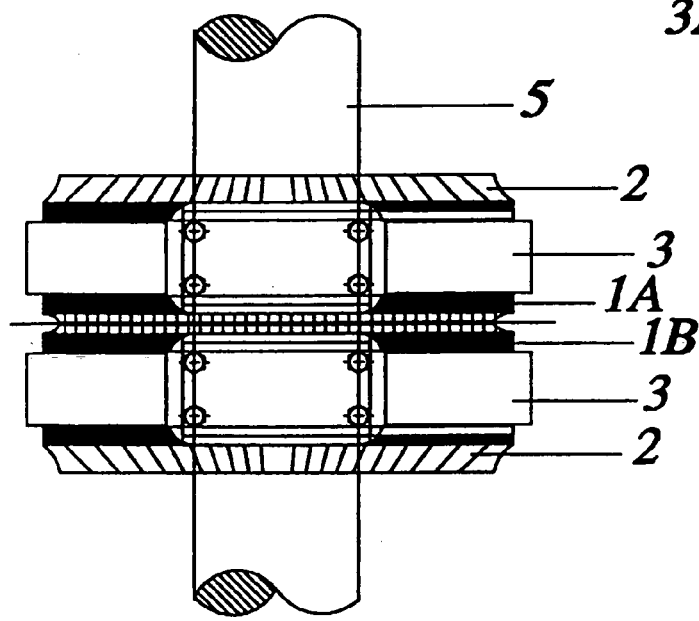
FIG. 3, a plan view on the eddy current brake.

The retarder of FIG. 1 has a number of magnet coils 22, which are mounted concentrically about a shaft or for instance an axle 5 of a rail vehicle on annular coil bodies or stators 3. One outer rotor disk 2, which is connected to the axle 5 in a manner fixed against relative rotation, is located at a slight spacing in front of the poles of the coils on each of the outer two sides of the stator 3. The stator housing is divided into two pieces, so that between the two stator halves 3a, 3b, there is a middle rotor disk 1, which is likewise connected to the axle 5 in a manner fixed against relative rotation.

When the coils are excited by electrical current, magnetic fields with alternating field directions occur at each of the poles located on the same face ends of the coil packets. In the braking event, eddy currents are then induced in the rotor disks 1, 2 that rotate in these nonhomogeneous magnetic fields, and the eddy currents exert a braking moment on the rotor disks 1, 2 that is transmitted to the axle 5.

Fastening the stator halves 3a, 3b of the stator is done by means of a mount 4, for instance on the chassis of a rail vehicle or motor vehicle.

Figure 4:
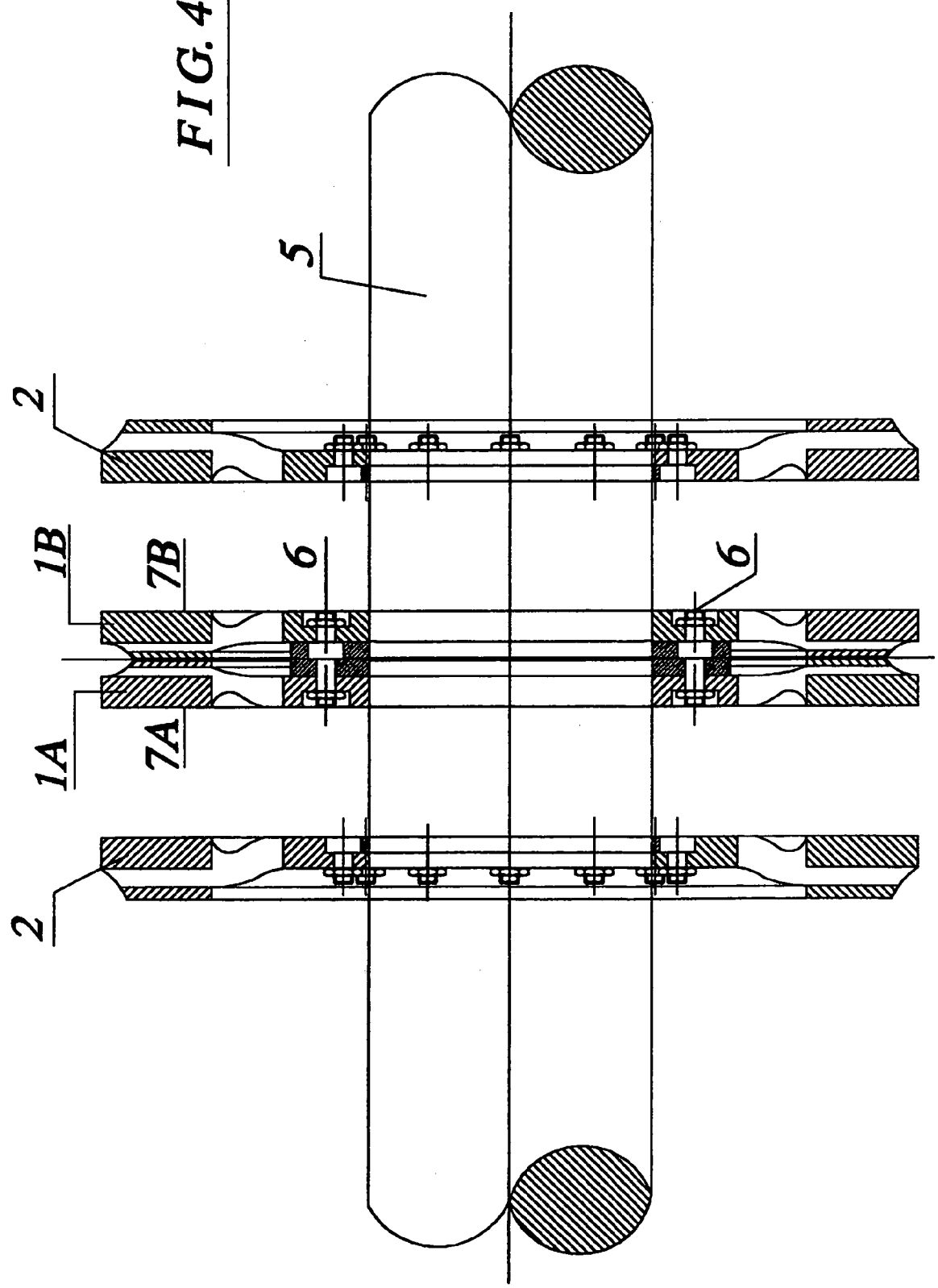
FIG. 4, a longitudinal section through the eddy current brake of FIG. 1.

It can be seen from FIG. 4 that the middle rotor 1 is embodied in two parts, with one rotor half 1a and a second rotor half 1b. The two rotor halves 1a, 1b are joined together in the radially inner region by means of screwing means 6. On their radially outer ends, in the region of the annular sections 7a, 7b opposite the pole plates of the coils, the two rotor halves 1a, 1b are movable in the axial direction, which can be attained for instance by means of a special toothing geometry 20 of the parts contacting one another of the rotor halves 1a, 1b. It is understood that the middle rotor disk 1, like the outer rotor disk 2, has cooling conduits for aspirating cooling air.

By means of the axial mobility of the rotor halves 1a, 1b of the middle rotor disk 1, it is attained that in operation of the retarder, at the attendant high temperatures between the pole plates of the stator 3 and the adjoining annular surface of the respective rotor disks 1, 2 or rotor half 1a, 1b, the same geometric conditions can become established, so that overall, the same braking action originates at each rotor 1, 2, or each rotor half 1a, 1b.

Figure 5:
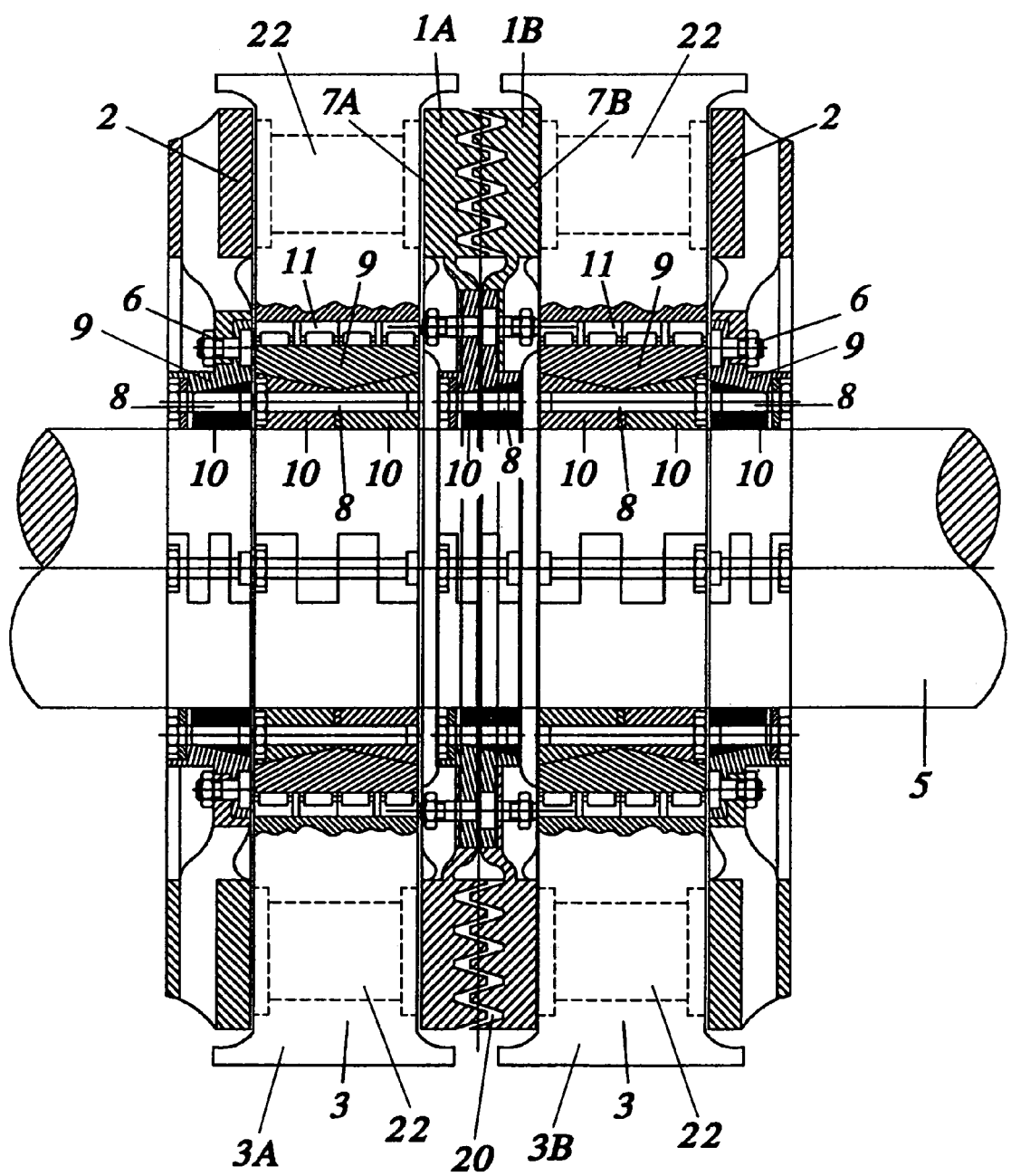
FIG. 5, a longitudinal section through a further embodiment of an eddy current brake of the invention, disposed on an axle of a rail vehicle.

The variant of FIG. 5 is distinguished from the version of FIGS. 1–4 in that the rotor disks 1a, 1b, 2 are mounted on the axle 5 of the rail vehicle via clamping rings. Annular elements, which comprise an outer annular element 9 and an inner annular element 10, are associated with the individual rotors 1a, 1b, 2 and the stators 3. The outer jacket of the inner annular element 10 is embodied conically. The outer annular element 9 comprises half-shells, which are fixed by means of a toothing, or set of teeth and an axially extending retaining element. By tightening each screw 8, in conjunction with the conical outer jacket face of the inner annular element 10, a pressing force onto the axle 5 is exerted onto the outer annular element 9. The fastening of the rotors 2 to the respective outer annular elements 9 is done by means of screwing means 6.

A bearing, preferably a needle bearing 11, is additionally located between the outer annular element 9 and the stators 3.

The mounting of the stators 3 is not done to the chassis, since in freight trains the axles 5 can shift axially by more than approximately 42 mm. Instead, tightening elements are provided, which are fixed to the wheel suspension and can also be retightened.

Since railroad cars, both freight cars and as a rule passenger cars as well, have no power supply of their own, it is recommended according to the invention that an electric generator be provided in addition, for supplying the coils 22 of the retarder and for supplying the electronics for controlling the retarder and its associated accumulator.

Figure 6:
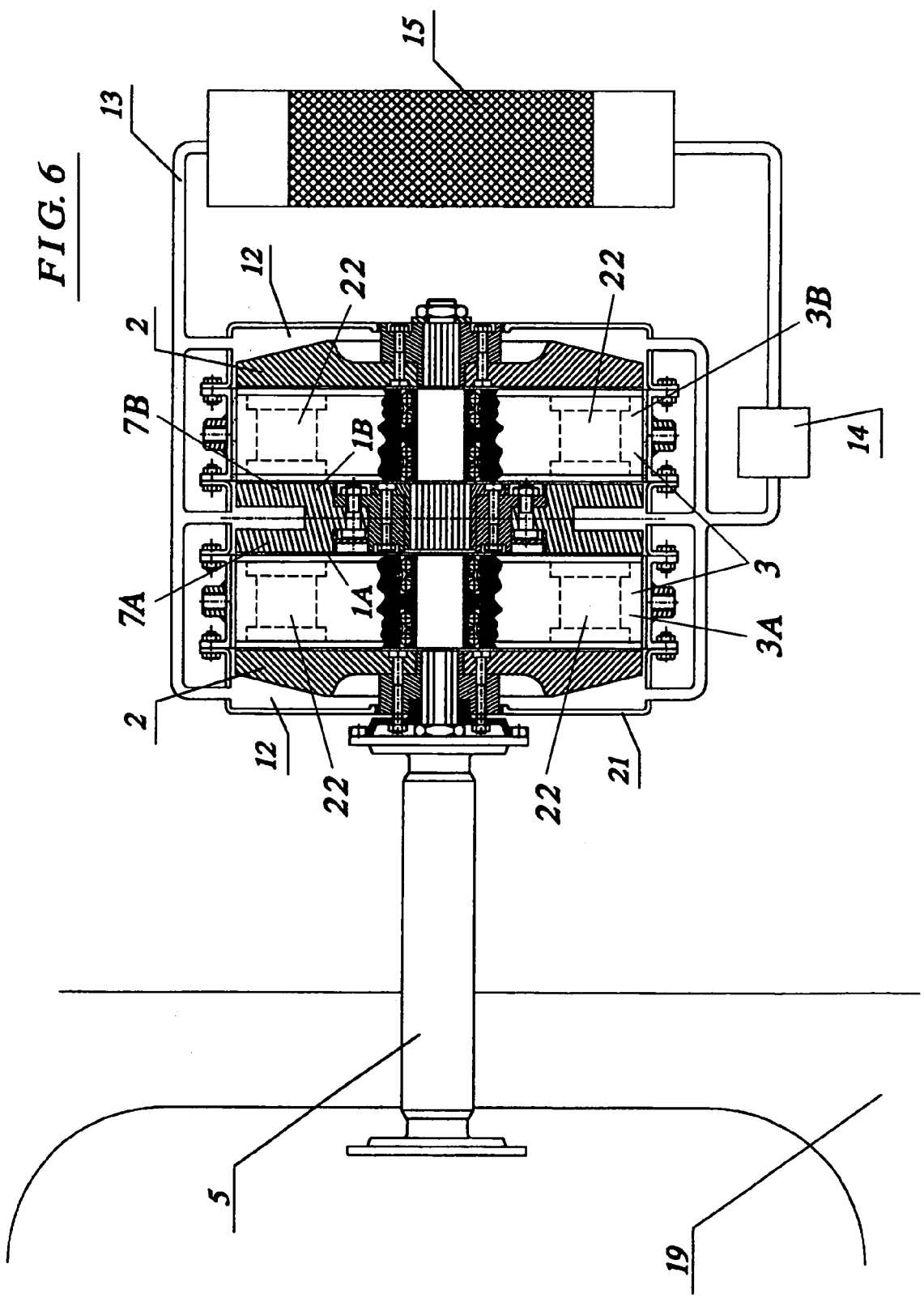
FIG. 6, a longitudinal section through an eddy current brake of the invention with integrated cooling.

The variant of FIG. 6 differs from the variant of FIG. 5 essentially in that the retarder is encapsulated by means of a housing 21, and the rotor disks 1a, 1b, 2 run in a fluid bath 12 for the sake of cooling. A coolant fluid 13 serves not for braking the rotors, as in hydrodynamic retarders, but instead serves solely to cool the rotor disks 1a, 1b, 2. As the material for the encapsulation, aluminum or the like can be considered, to enable good heat dissipation in addition. The coolant fluid 13 is brought into circulation by means of an electric pump 14 and delivered to a heat exchanger 15. It can be appreciated that for the rotation of the rotors 1a, 1b, 2 in the fluid bath 12, suitable seals are provided on the outer housing.

Both the suspension and the energy supply are done here as in the variant of FIG. 5.

Figure 7:
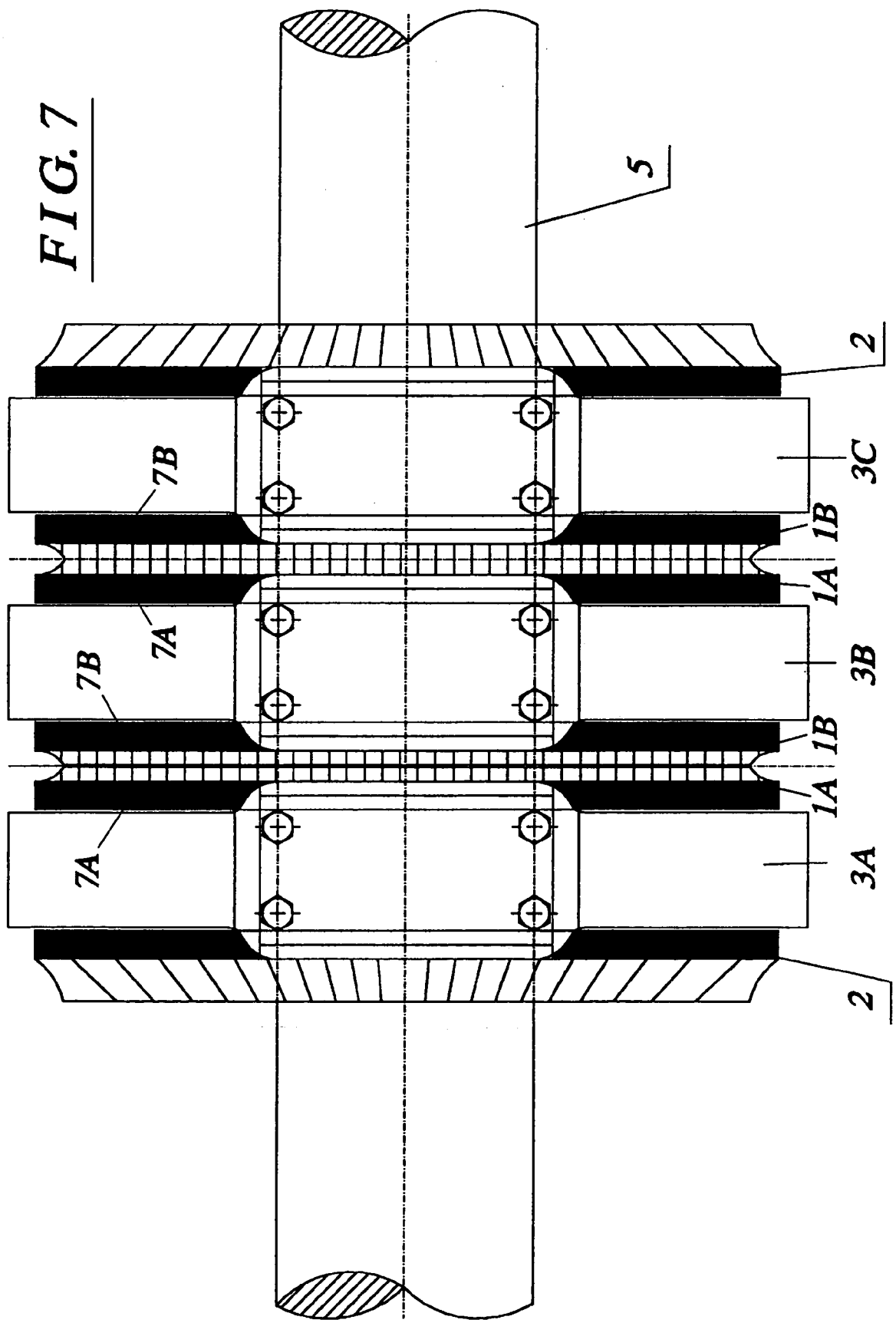
FIG. 7, a plan view on a further embodiment of an eddy current brake of the invention.

In the exemplary embodiment of FIG. 7, two such middle rotor disks 1, embodied as rotor pairs 1a, 1b, are disposed in the interior of the retarder, and as a result, for comparable geometric dimensions, the braking force of the rotor and thus its performance can be enhanced still further.

Figure 8:
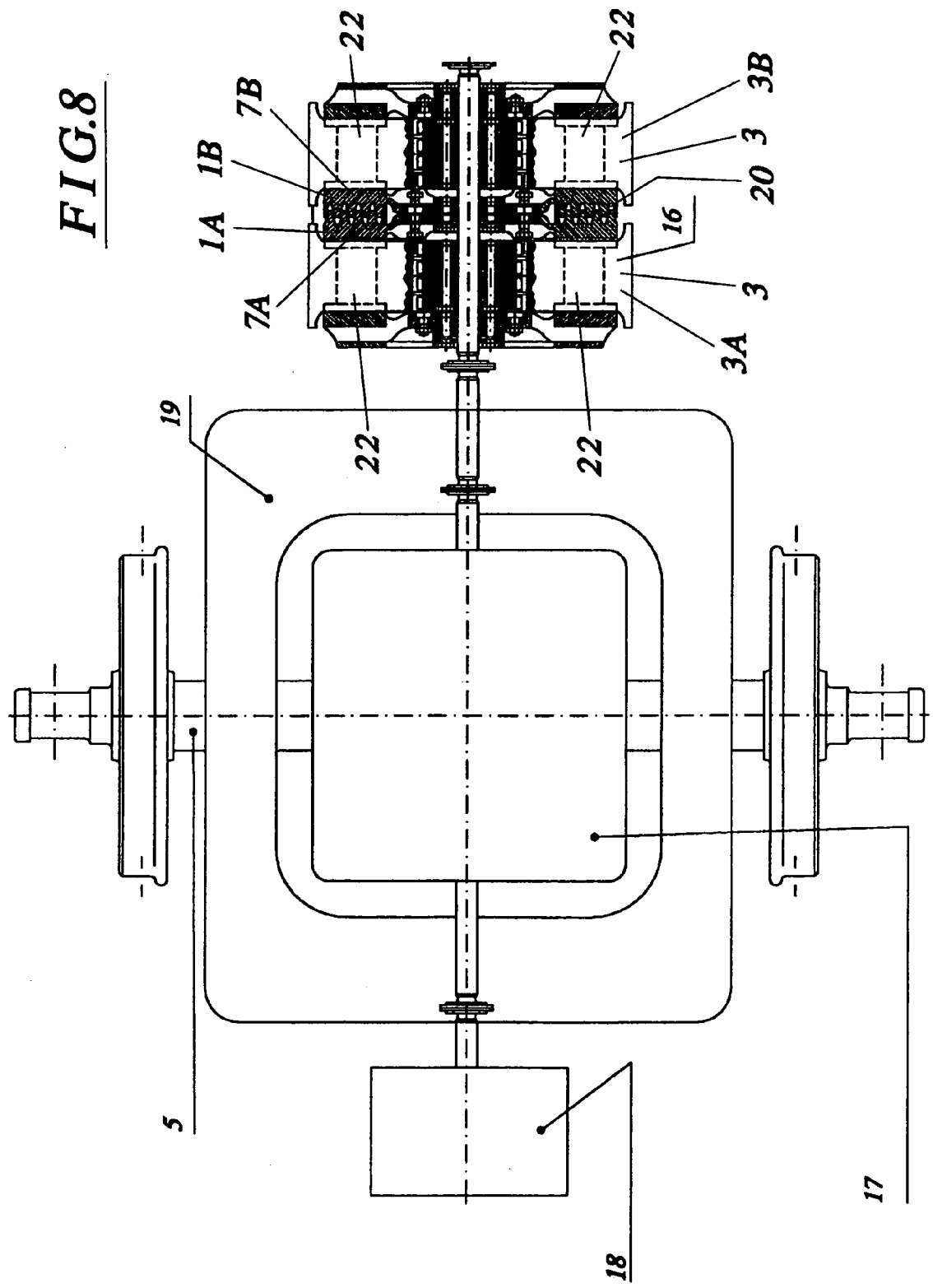
FIG. 8, a schematic view of an eddy current brake of the invention, disposed on the undercarriage of a locomotive.
Figure 9:
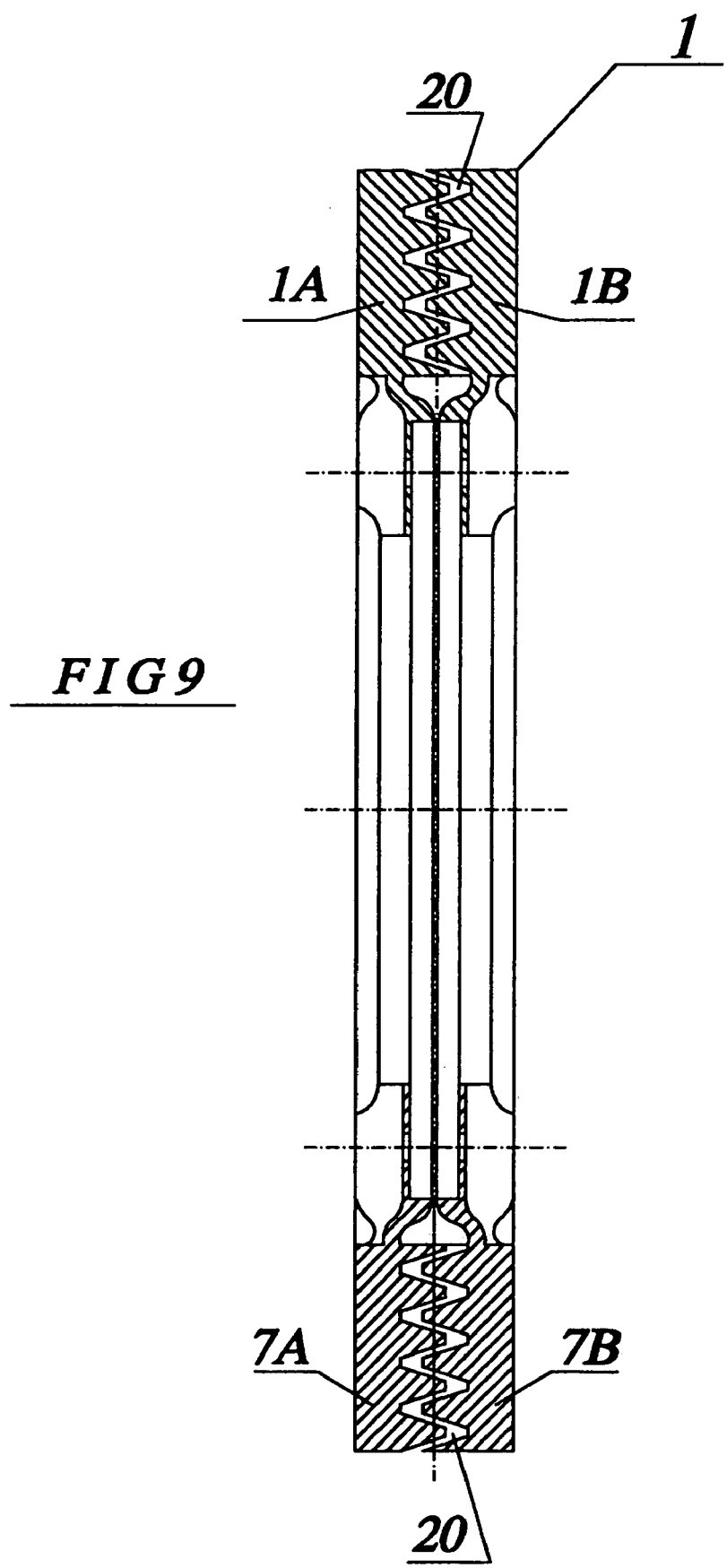
FIG. 9, a middle rotor disk, in section with toothing geometry.

It is understood, however, that it is also possible for the retarder 16, as shown schematically in FIG. 8, to be disposed on the undercarriage 19 of a rail vehicle, especially a passenger car; in that case, an intermediate gear 17 is provided between the retarder 16 and the axle 5. The generator 18, which already exists in such rail vehicles at present, for the power supply is located on the side opposite the retarder 16.

LIST OF REFERENCE NUMERALS

1—Middle rotor disk
1a—Rotor half
1b—Rotor half
2—Outer rotor disk
3—Stator
3a—Stator half
3b—Stator half
3c—Stator section
4—Mount
5—Axle
6—Screw fastening
7a—Annular section
7b—Annular section
8—Disk
9—Annular groove
10—Annular groove
11—Needle bearing
12—Fluid bath
13—Cooling fluid
14—Electric pump
15—Heat exchanger
16—Retarder
17—Intermediate gear
18—Generator
19—Undercarriage
20—Toothing geometry
21—Housing
22—Magnetic coils

The invention claimed is:

1. A retarder (16), as a braking device or auxiliary braking device for vehicles, having a stator (3), comprising at least two axially spaced-apart stator halves (3a, 3b), which each have magnetic field coils and are coupled to the vehicle or to an undercarriage (19) of the vehicle, and a rotor disk (1) connected to an axle (5) or shaft of the vehicle, comprising two adjacent rotor halves (1a, 1b), the rotor halves (1a, 1b) having an axial clearance from one another in a radially outer annular section (7a, 7b) and the rotor halves (1a, 1b) being disposed axially between the at least two stator halves (3a, 3b), characterized in that the rotor halves (1a, 1b) are embodied for a relative motion in the axial direction to one another, and that the rotor halves (1a, 1b) are embodied as separate components from one another, which are joined to one another in a radially inner annular region, oriented toward the axle (5) or shaft, and that the rotor halves (1a, 1b) are secured to the axle (5) or shaft by tightening elements, comprising outer and inner annular elements (9, 10) which are wedged to one another in the axial direction via corresponding oblique faces or conical faces by screws (8) to press the inner annular elements (10) onto the axle (5).

2. The retarder of claim 1, characterized in that the retarder is encapsulated in a housing (21), comprising aluminum or the like, and the rotor disks (1, 1a, 1b, 2) are acted upon by a fluid bath (12), comprising a coolant fluid (13).

3. The retarder of claim 2, characterized in that the coolant fluid (13) is circulated by a pump, such as an electric pump (14), in a closed loop between the housing (21) and a heat exchanger (15).

4. The retarder of claim 1, characterized in that the two rotor halves (1a, 1b) have a clearance from one another only in a radially outer annular section (7a, 7b), which is adjacent to the magnetic field coils of the stator (3).

5. The retarder of claim 4, characterized in that the radially outer annular sections (7a, 7b) of the rotor halves (1a, 1b) are embodied for a relative motion in the axial direction to one another to allow for thermal expansion of the outer annular sections (7a, 7b).

6. The retarder of claim 1, characterized by an associated power supply for supplying the magnetic field coils and the electronic controller of the retarder (16), which power supply is formed by a generator (18).

7. The retarder of claim 1, characterized in that an intermediate gear (17) is disposed between the axle (5) or shaft and the retarder (16).

8. The retarder of claim 1, characterized in that a needle bearing (11) is disposed between the outer annular element (9) and the annularly embodied stator (3).

9. The retarder of claim 1, characterized in that the two rotor halves (1a, 1b) of the at least one rotor disk (1) divided into two parts, in the region of the radially outer annular sections (7a, 7b) oriented toward one another, have an axial clearance from one another which is adjacent to the magnetic field coils of the stator (3), the clearance being provided by a toothing geometry (20), comprising a corresponding and partly meshing toothing and counterpart toothing on the respective rotor halves (1*a*, 1*b*), said toothing comprising a continuous circular annular structure on each of the rotor halves (1*a*, 1*b*) in the region of the radially outer annular sections (7*a*, 7*b*).

10. The retarder of claim 1, characterized in that the tightening elements within the stator (3) comprise one outer annular element (9) and two inner annular elements (10), the outer annular element (9) has two oblique faces or conical faces, and each of the inner annular elements (10) has an oblique or conical face which is wedged to one of the corresponding oblique or conical faces on the outer annular element (9) by screws (8) to press the two inner annular elements (10) onto the axle (5).

11. The retarder of claim 1, characterized in that the tightening elements within the stator (3) comprise one outer annular element (9) and two inner annular elements (10), the outer annular element (9) has two oblique faces or conical faces, and each of the inner annular elements (10) has an oblique or conical face which is wedged to one of the corresponding oblique or conical faces on the outer annular element (9) by screws (8) to press the two inner annular elements (10) onto the axle (5).

12. A retarder (16), as a braking device or auxiliary braking device for vehicles, having a stator (3), comprising at least two axially spaced-apart stator halves (3*a*, 3*b*), which each have magnetic field coils and are coupled to the vehicle or to an undercarriage (19) of the vehicle, and a rotor disk (1), connected to an axle (5) or shaft of the vehicle, comprising two adjacent rotor halves (1*a*, 1*b*), the rotor halves (1*a*, 1*b*) having an axial clearance from one another in a radially outer annular section (7*a*, 7*b*) and the rotor halves (1*a*, 1*b*) being disposed axially between the at least two stator halves (3*a*, 3*b*), characterized in that the rotor halves (1*a*, 1*b*) are embodied for a relative motion in the axial direction to one another, the rotor halves (1*a*, 1*b*) are embodied as separate components from one another, which are joined to one another in a radially inner annular region, oriented toward the axle (5) or shaft, and the two rotor halves (1*a*, 1*b*) of the at least one rotor disk (1) divided into two parts, in the region of the radially outer annular sections (7*a*, 7*b*) oriented toward one another, have an axial clearance from one another which is adjacent to the magnetic field coils of the stator (3), the clearance being provided by a toothing geometry (20), comprising a corresponding and partly meshing toothing and counterpart toothing on the respective rotor halves (1*a*, 1*b*), said toothing comprising a continuous circular annular structure on each of the rotor halves (1*a*, 1*b*) in the region of the radially outer annular sections (7*a*, 7*b*).

13. The retarder of claim 12, characterized in that associated with an outer side of the stator (3), or one of the respective stator halves (3*a*, 3*b*), is a further outer, one-piece rotor disk (2), which is connected in a manner fixed against relative rotation to the axle (5) or shaft.

14. The retarder of claim 13, characterized in that associated with the stator (3), axially spaced apart from it, is a further stator section (3*c*), which is comparable in shape and structure to the stator halves (3*a*, 3*b*), and a second rotor disk (1), divided into two parts and connected in a manner fixed against relative rotation to the axle (5) or shaft is disposed in a gap formed by one stator half (3*a*, 3*b*) and the further stator section (3*c*).

15. The retarder of claim 14, characterized in that the rotor, the rotor disks (1, 2) or rotor halves (1*a*, 1*b*) of the rotor, and/or the stator (3), the stator halves (3*a*, 3*b*) or the stator section (3*c*), are formed by components that are divided in the radial direction and that after installation are solidly joined to one another by connecting means.

16. The retarder of claim 14, characterized in that the stator (3), the stator halves (3*a*, 3*b*) or the stator section (3*c*), are joined to the vehicle or to a undercarriage (19) via adjustable mounts.

17. The retarder of claim 12, characterized in that the two rotor halves (1*a*, 1*b*) have a clearance from one another only in a radially outer annular section (7*a*, 7*b*), which is adjacent to the magnetic field coils of the stator (3).

18. The retarder of claim 17, characterized in that the radially outer annular sections (7*a*, 7*b*) of the rotor halves (1*a*, 1*b*) are embodied for a relative motion in the axial direction to one another during operation of the braking device to allow for thermal expansion of the outer annular sections (7*a*, 7*b*).

19. The retarder of claim 12, characterized in that said toothing comprises a set of concentric annular rings on each of the rotor halves (1*a*, 1*b*) in the region of the radially outer annular sections (7*a*, 7*b*).

20. The retarder of claim 19, characterized in that the concentric annular rings are spaced radially apart on each of the rotor halves (1*a*, 1*b*) and are intermeshed with the concentric annular rings on the other of the rotor halves (1*a*, 1*b*).

21. The retarder of claim 12, characterized in that the stator (3) is connected to a wheel suspension of the vehicle via variable or adjustable tightening elements.

22. A retarder (16), as a braking device or auxiliary braking device for rail vehicles, having a stator (3), comprising at least two axially spaced-apart stator halves (3*a*, 3*b*), which each have magnetic field coils and are coupled to the vehicle or to an undercarriage (19) of the vehicle, and a rotor disk (1), connected to an axle (5) or shaft of the vehicle, comprising two adjacent rotor halves (1*a*, 1*b*), the rotor halves (1*a*, 1*b*) having an axial clearance from one another in a radially outer annular section (7*a*, 7*b*) and the rotor halves (1*a*, 1*b*) being disposed axially between the at least two stator halves (3*a*, 3*b*), characterized in that the rotor halves (1*a*, 1*b*) are embodied for a relative motion in the axial direction to one another, the rotor halves (1*a*, 1*b*) are embodied as separate components from one another, which are joined to one another in a radially inner annular region, oriented toward the axle (5) or shaft, and the rotor halves (1*a*, 1*b*) are secured to the axle (5) or shaft by tightening elements, comprising outer and inner annular elements (9, 10) which are wedged to one another in the axial direction via corresponding oblique faces or conical faces by screws 8 to press the inner annular elements (10) onto the axle (5).

* * * * *